(12) United States Patent
Kalmes et al.

(10) Patent No.: US 9,656,705 B2
(45) Date of Patent: May 23, 2017

(54) MOBILE MACHINE TRACK ROLLER HAVING A GUARD MEMBER

(71) Applicant: Caterpillar Inc., Peoria, IL (US)

(72) Inventors: Donald John Kalmes, Peoria, IL (US); Allen Jay Weeks, Morton, IL (US); Connor John Haas, Peoria, IL (US); Timothy Richard Hoyt, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 238 days.

(21) Appl. No.: 14/667,299

(22) Filed: Mar. 24, 2015

(65) Prior Publication Data

US 2015/0284042 A1 Oct. 8, 2015

Related U.S. Application Data (60) Provisional application No. 61/974,578, filed on Apr. 3, 2014.

(51) Int. Cl.
*B62D 55/088* (2006.01)
*B62D 55/14* (2006.01)
*B62D 55/15* (2006.01)

(52) U.S. Cl.
CPC ........... *B62D 55/088* (2013.01); *B62D 55/14* (2013.01); *B62D 55/15* (2013.01)

(58) Field of Classification Search
CPC ....... B62D 55/008; B62D 55/15; B62D 55/14
USPC ........ 305/100, 110, 115, 107, 119, 136, 138, 305/139
See application file for complete search history.

(56) References Cited

U.S. PATENT DOCUMENTS

| | | | | |
|---|---|---|---|---|
| 5,553,931 A | * | 9/1996 | Diekevers | ............... B62D 55/15 305/100 |
| 6,019,443 A | * | 2/2000 | Freeman | ............... B62D 55/088 305/100 |
| 6,092,809 A | | 7/2000 | Keifer et al. | |

(Continued)

OTHER PUBLICATIONS

Final Drive Photographs (320D OPL) taken approximately Sep. 2008, Peoria, IL.

(Continued)

*Primary Examiner* — S. Joseph Morano
*Assistant Examiner* — Jean Charleston
(74) *Attorney, Agent, or Firm* — Finnegan, Henderson, Farabow, Garrett & Dunner, LLP (57) ABSTRACT

A track roller for a mobile machine is disclosed. The track roller may have a shaft defining a central axis, and a roller body connected to the shaft and configured to rotate around the central axis relative to the shaft. The track roller may also have a sealing member positioned between the shaft and the roller body, and a collar member secured to the shaft and at least partially covering the sealing member. A passageway having an opening may be defined between the collar member and the roller body. The track roller may further have a guard member secured to the shaft, the guard member having a main body and an upper rim extending from the main body towards the roller body. The guard member may also have a plurality of projections extending from the main body towards the roller body, and a plurality of openings formed between the upper rim and the projections.

20 Claims, 5 Drawing Sheets

(56) References Cited

U.S. PATENT DOCUMENTS

| | | | | |
|---|---|---|---|---|
| 6,481,807 B1 * | 11/2002 | Barani | ................... | B62D 55/08 |
| | | | | 305/100 |
| 8,356,680 B2 * | 1/2013 | Jackson | ............... | B62D 55/125 |
| | | | | 180/337 |
| 2009/0085303 A1 | 4/2009 | Kometani et al. | | |

OTHER PUBLICATIONS

Final Drive Photographs (345C OPL) taken approximately Sep. 2008, Peoria, IL.

Final Drive Photographs (385C OPL) taken approximately Sep. 2008, Peoria, IL.

* cited by examiner

MOBILE MACHINE TRACK ROLLER HAVING A GUARD MEMBER

RELATED APPLICATION

This application is based on and claims priority to U.S. Provisional Application No. 61/974,578 filed on Apr. 3, 2014, the contents of which are expressly incorporated herein by reference.

TECHNICAL FIELD

The present disclosure is directed to a mobile machine track roller, and more particularly, to a mobile machine track roller having a guard member.

BACKGROUND

Track-type machines, for example dozers, excavators, and skid-steer loaders, are commonly used in applications where traction is critical or low ground pressure is important. These machines include a frame that supports an internal combustion engine, and left and right undercarriages that transfer power from the engine to a ground surface. The left and right undercarriages are rigidly mounted at one end to the frame and free to pivot in a vertical direction about the mounting location. Each of the undercarriages includes a final drive with a sprocket at the proximal end that is driven by the engine, and an idler wheel located at the distal end and operatively connected to the sprocket via an idler frame assembly. The idler frame assembly includes a plurality of upper carrier rollers and lower rollers that support an endless track wrapped in a loop around the sprocket and idler. The rollers each contain mechanical face seals that inhibit foreign materials from entering and lubricating fluid from exiting an interior of the roller.

In some instances, debris in the environment of the machine may enter a passageway extending into an interior of a roller and reach the mechanical face seals. The debris may pack into the seal cavity and obstruct the seal, allowing lubricating fluid to escape and/or preventing proper rotation of the roller, causing the roller to fail. For example, during use of a track-type machine in landfill applications, wire, rope, and/or other trash debris may find its way into the passageway, reach the seal, and cause the roller to fail. In other instances, materials such as dirt, sand, and clay may build up in and around the seal and cause failure.

One attempt to protect a mechanical face seal of a track-type machine is disclosed in U.S. Pat. No. 8,356,680 that issued to Jackson on Jan. 22, 2013 ("the '680 patent"). In particular, the '680 patent discloses a guard ring positioned to cover an opening into a seal protection passageway that leads to the seal of a final drive assembly of the track-type machine. The guard ring is bolted to a fixed hub and defines a labyrinth interface with a rotating sprocket hub. The labyrinth interface includes a tortuous pathway for inhibiting debris from entering the seal protection pathway. The guard ring also defines a drain passage that allows liquid debris that makes its way inside the guard ring to flow out.

Another attempt to protect a mechanical face seal of a track-type machine includes a pair of bolt-on rings that surround the seal of a final drive assembly. One of the bolt-on rings is a stationary guard ring that includes a plurality of enlarged openings that provide direct communication with the seal. The openings may extend around at least a lower half of the guard ring and may be large enough such that debris (e.g., dirt, mud, etc) that enters an opening may fall back out via gravity.

Although the guard rings described above may help inhibit debris from causing failure of mechanical face seal of a final drive assembly, they may suffer from some drawbacks. For example, while the labyrinth interface of the guard ring of the '680 patent may inhibit some debris from reaching the seal, fine debris such as dirt and sand may pack in the labyrinth passages and hinder relative rotation of the fixed hub and sprocket hub. Further, while the drain passage of the guard ring of the '680 patent may allow liquid debris to escape once inside, solid debris that does make its way into the guard ring may be trapped, allowing debris to build up and eventually reach the seal and/or damage the guard ring. Regarding the bolt-on guard ring described above, while the openings may allow fine debris to fall out via gravity, the openings may also provide direct access to the seal for larger debris to cause damage. Further, each of the guard rings described above are configured for protecting a final drive assembly and may not be configured for protection of track rollers and idlers, which include different geometries, features, and configurations of fixed and rotating components.

The present disclosure is directed to overcoming one or more of the problems set forth above and/or other problems of the prior art.

SUMMARY

In one aspect, the present disclosure is directed to a track roller for a mobile machine. The track roller may include a shaft defining a central axis, and a roller body connected to the shaft and configured to rotate around the central axis relative to the shaft. The track roller may also include a sealing member positioned between the shaft and the roller body, and a collar member secured to the shaft and at least partially covering the sealing member. A passageway including an opening may be defined between the collar member and the roller body. The track roller may further include a guard member secured to the shaft, the guard member including a main body and an upper rim extending from the main body towards the roller body. The guard member may also include a plurality of projections extending from the main body towards the roller body, and a plurality of openings formed between the upper rim and the projections. The upper rim may extend around approximately half of a circumference of the main body and extend out to a position adjacent the roller body that is radially farther away from the central axis than the opening.

In another aspect, the present disclosure is directed to a track roller for a mobile machine. The track roller may include a shaft defining a central axis, and a roller body connected to the shaft and configured to rotate around the central axis relative to the shaft. The track roller may also include a sealing member positioned between the shaft and the roller body, and a collar member secured to the shaft and at least partially covering the sealing member. A passageway including an opening may be defined between the collar member and the roller body. The track roller may further include a guard member secured to the shaft, the guard member including a main body, an upper portion, and a lower portion including a plurality of openings. The plurality of openings may be located around approximately half of a circumference of the guard member, and may communicate an interior space, between the guard member and the collar member, with an exterior of the guard member In yet another aspect, the present disclosure is directed to a track roller for a mobile machine. The track roller may include a shaft defining a central axis, and a roller body connected to the shaft and configured to rotate around the central axis relative to the shaft. The track roller may also include a sealing member positioned between the shaft and the roller body, and a collar member secured to the shaft and at least partially covering the sealing member. A passageway including an opening may be defined between the collar member and the roller body. The track roller may further include a guard member secured to the shaft, the guard member including a main body, a closed upper portion including an upper rim extending from the main body towards the roller body, and a partially-open lower portion including a plurality of openings. The upper rim may extend to a position adjacent the roller body that is radially farther away from the central axis than the opening into the passageway and the plurality of openings may communicate an interior space, located between the main body and the collar member, with an exterior of the guard member.

DETAILED DESCRIPTION

Figure 1:
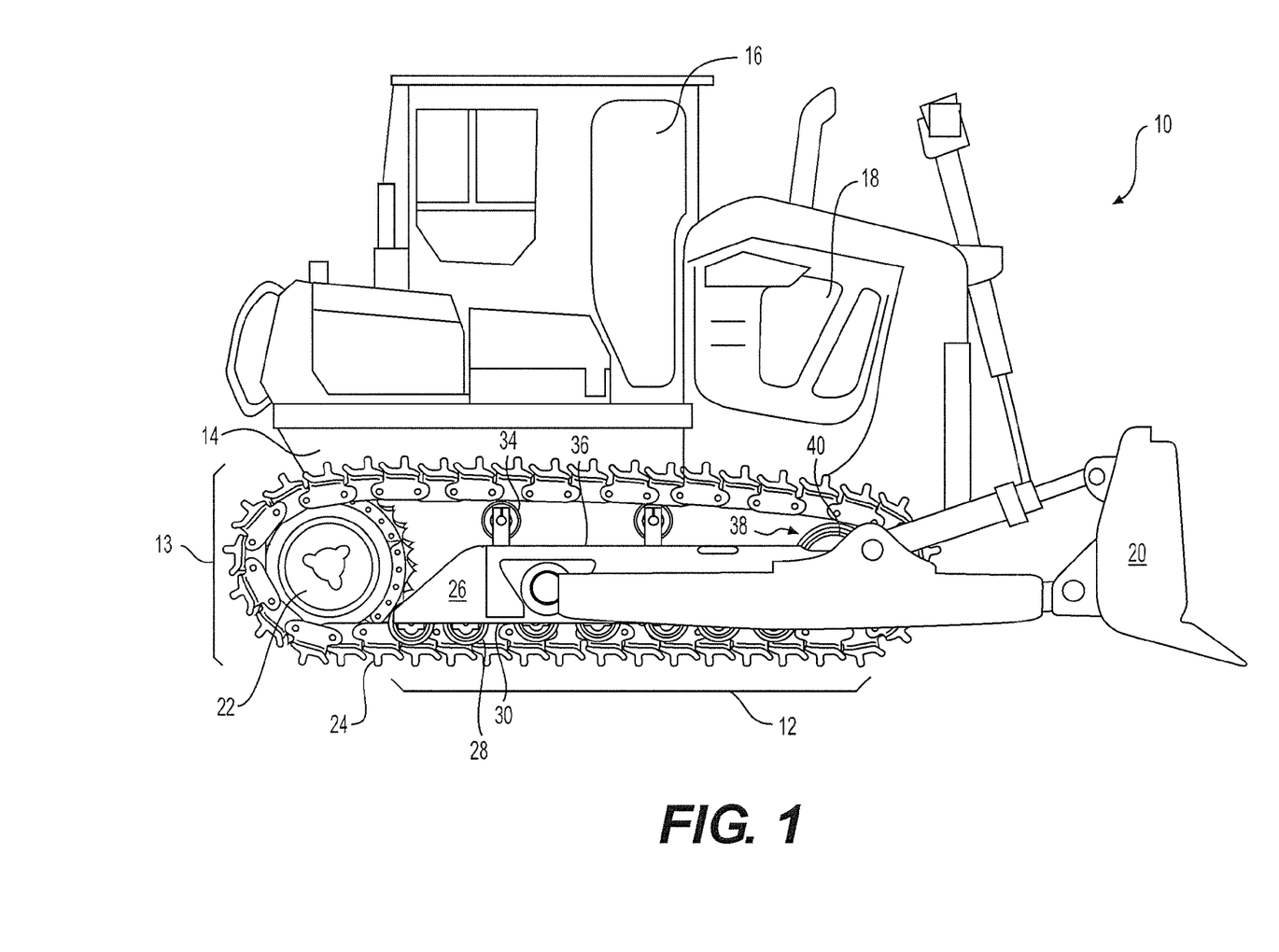
FIG. 1 is a side-view pictorial illustration of an exemplary disclosed track-type machine.

FIG. 1 illustrates a track-type machine 10 having an exemplary disclosed track roller assembly 12 located within an undercarriage 13 on each side of machine 10 (only one undercarriage 13 is shown in FIG. 1). In accordance with one aspect of this disclosure, machine 10 is illustrated as a dozer. It should be noted, however, that one or more track roller assemblies 12 may be similarly used with another type of tracked machine, if desired. Machine 10 may include a machine frame 14 at least partially defining an operator station 16 and supporting a front-mounted engine 18, and a work tool 20 operatively supported by track roller assemblies 12 at a front end of machine frame 14 proximate engine 18. Engine 18 may generate a power output that can be directed through a sprocket 22 and endless track 24 of undercarriage 13 to propel machine 10 and/or directed through a hydraulic circuit (not shown) to move work tool 20. Operator station 16 may include any number and type of input devices used by an operator for control of engine 18 and/or work tool 20.

Each track roller assembly 12 may include a plurality of components configured to support endless track 24. In particular, track roller assembly 12 may include, among other things, a track roller frame 26, a plurality of lower rollers 28 supported by track roller frame 26 at a lower surface 30, a plurality of carrier rollers 34 supported by track roller frame 26 at an upper surface 36 opposite lower rollers 28, and an idler assembly 38 operatively connected to an end of track roller frame 26 opposite sprocket 22. As used herein, lower rollers 28, carrier rollers 34, and idler assembly 38 may each be considered a "track roller". Endless track 24 may wrap around and encircle sprocket 22, lower rollers 28, carrier rollers 34, and idler assembly 38. Track roller frame 26 may form a generally hollow support structure that at least partially houses the remaining components of track roller assembly 12 and transfers loads from endless track 24 and from work tool 20 to machine frame 14.

In an exemplary embodiment, lower rollers 28 may be arranged in at least one row that extends in a lengthwise direction of track roller frame 26. Each lower roller 28 may be configured to engage a centralized chain of links and/or bushings at an inside surface of endless track 24. In this manner, lower rollers 28 may function as lower guides for the chain. Carriers rollers 34, similar to lower rollers 28, may also be arranged in at least one row that extends in a lengthwise direction of track roller frame 26. However, in contrast to lower rollers 28, carriers rollers 34 may be fewer in number and cantilevered from one side of upper surface 36 of track roller frame 26 to support the chain described above. Idler assembly 38 may include an idler wheel 40 for supporting the chain at an end of track roller frame 26 opposite sprocket 22. Idler wheel 40 may be secured to track roller frame 26 in a manner known in the art. For example, while not shown in FIG. 1, idler assembly 38 may include a shaft, a yoke, and a pair of end caps. It should be understood that other designs and/or arrangements of lower rollers 28, carrier rollers 34, and/or idler assembly 38 may also be utilized, if desired. For example, track roller assembly 12 may be arranged with more than one idler assembly 38, such as in embodiments in which machine 10 is an elevated tractor having two idler assemblies 38 associated with each track roller assembly.

Figure 2:
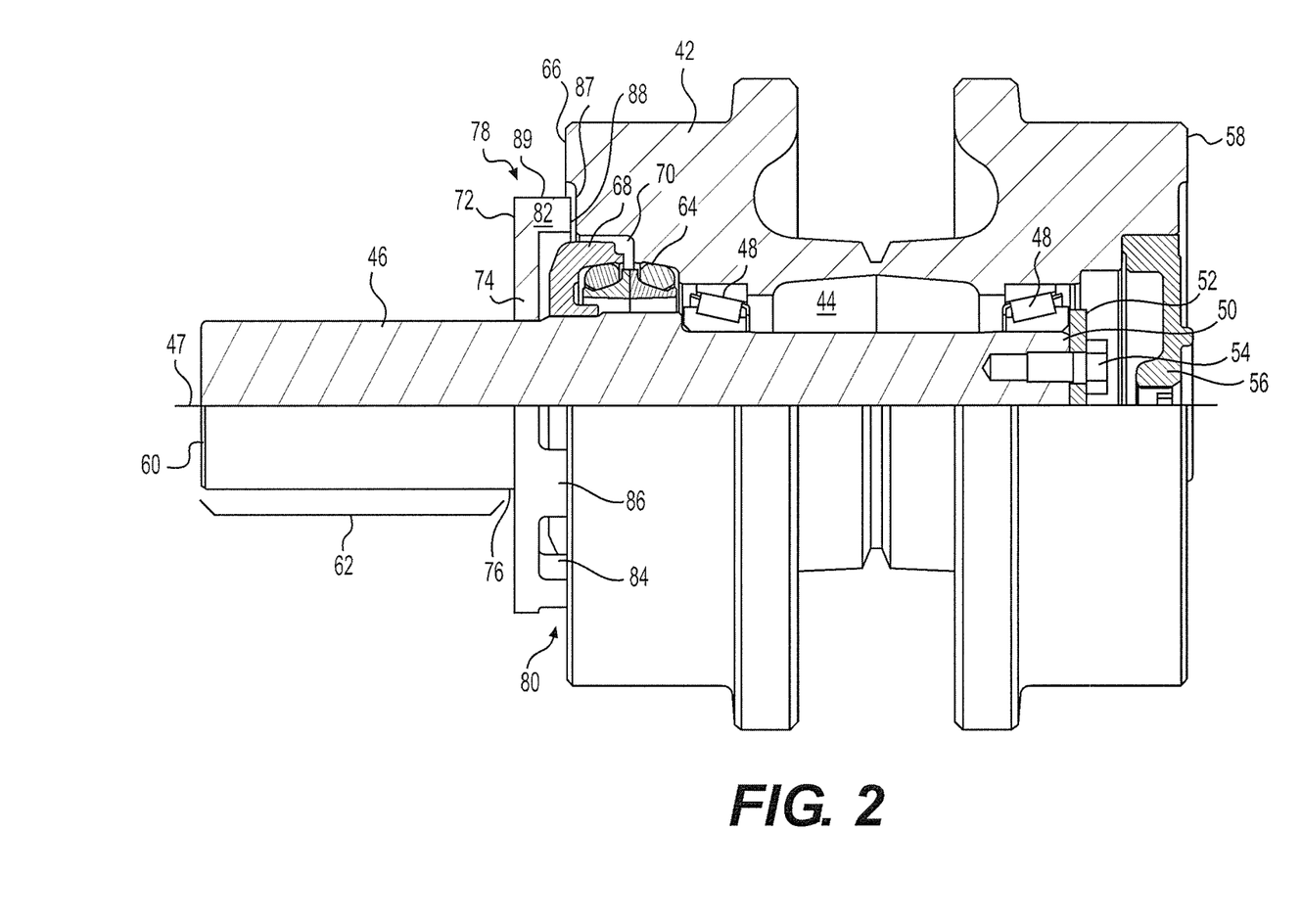
FIG. 2 is a cut-away view of an exemplary disclosed track roller that may be used in conjunction with the track-type machine of FIG. 1.

FIG. 2 depicts an exemplary carrier roller 34 in greater detail. As shown, carrier roller 34 may include a roller body 42 having an axial bore 44 through which a shaft 46 having a central axis 47 extends. Roller body 42 may be mounted to shaft 46 and configured to support a portion of endless track 24 in a conventional manner. Roller body 42 may be configured to rotate around central axis 47 relative to the shaft 46 by one or more bearings 48. A first end 50 of shaft 46 may be secured to a retainer plate 52 by a plurality of bolts 54. A cover 56 may be secured to a corresponding end 58 of roller body 42 (e.g., by a plurality of bolts) to enclose first end 50, retainer plate 52, and bolts 54 inside roller body 42 and seal axial bore 44 at end 58 of roller body 42.

Shaft 46 may extend from first end 50 through axial bore 44 to a second end 60 spaced from roller body 42, forming a support portion 62. Support portion 62 may be secured to track roller frame 26 in a conventional manner to secure roller body 42 in a position to support endless track 24. A sealing member 64 may be secured at a corresponding end 66 of roller body 42 between shaft 46 and an interior portion of roller body 42 to seal axial bore 44 at end 66 of roller body 42. In an exemplary embodiment, sealing member 64 may be a mechanical face seal, although other types of seals are possible. Sealing member 64 may be configured to inhibit foreign materials from entering an interior portion of axial bore 44 while maintaining lubricating fluid inside axial bore 44 and in fluid communication with bearings 48.

As shown in FIG. 2, a collar member 68 may be secured to shaft 46 and positioned to cover at least a portion of sealing member 64. In an exemplary embodiment, collar member 68 may be fixed to shaft 46 (such as by press-fitting, a retention pin, etc.) and include a cover portion positioned over a fixed portion of sealing member 64. In this way, collar member 68 may be configured to help inhibit foreign materials from interfering with sealing member 64. However, a passageway 70 leading from an exterior of roller body 42 to sealing member 64 may be formed between fixed collar member 68 and rotatable roller body 42. Without additional protection, passageway 70 may be susceptible to allowing foreign materials, such as debris, to reach and interfere with sealing member 64.

Figure 3:
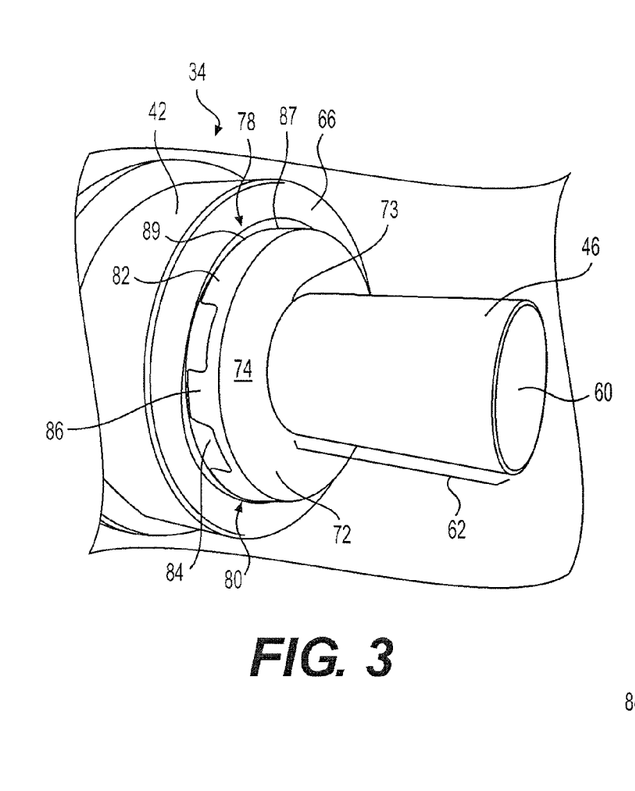
FIG. 3 is a perspective view of the track roller of FIG. 2.

As shown in FIGS. 2-3, a first embodiment of a device for protecting sealing member 64 includes a guard member 72. As shown in FIG. 2, guard member 72 may be positioned to cover an opening to passageway 70. Guard member 72 may include a cylindrical main body 74. In an exemplary embodiment, main body 74 may be fixedly secured to shaft 46, such as by press-fitting a bore 76 onto shaft 46. In an alternative embodiment, main body 74 may be secured to a carrier roller mount attached to track roller frame 26 (and to which second end 60 of shaft 46 may be secured). Guard member 72 may be fabricated from a strong and durable material, such as steel, although other materials may be possible.

In an exemplary embodiment, guard member 72 may include a closed upper portion 78 and a partially-open lower portion 80. Upper portion 78 may be include an upper rim 82 extending from main body 74 towards roller body 42. Lower portion 80 may include a plurality of openings 84 formed around a perimeter thereof. Openings 84 may be defined by opposing ends of upper rim 82 and a plurality of projections 86 extending toward roller body 42. In an exemplary embodiment, upper rim 82 may extend around approximately half (e.g., an upper half) of a circumference of cylindrical main body 74 (e.g., approximately 35-65% of the circumference). Similarly, openings 84 may be located around approximately half (e.g., a lower half) of the circumference of guard member 72 (e.g., approximately 35-65% of the circumference). As shown in FIG. 2, openings 84 may communicate an interior space, located between the main body 74 and collar member 68, with an exterior of guard member 72.

As shown in FIG. 2, guard member 72 may include a maximum diameter that is greater than a maximum diameter of collar member 68. Thus, upper rim 82 may extend out to a position adjacent roller body 42 that is radially farther away from central axis 47 than the cover portion of collar member 68 and the opening into passageway 70. In this way, upper rim 82 may protect the opening into passageway 70 and thereby inhibit foreign materials from entering passageway 70.

In addition, upper rim 82 may extend into a recess 87 formed in a side of roller body 42. Due to this configuration, roller body 42 may overlie at least a portion of an upper surface 89 of upper rim 82. In some embodiments, a space 88 may be formed between upper rim 82 and roller body 42. However, since upper rim 82 extends into recess 87, an opening into space 88 may be arranged substantially perpendicular to the extent of space 88. In this way, it may be made difficult for foreign materials to enter space 88. It should be understood, however, that upper rim 82 may not extend into recess 87, and, in some embodiments, roller body 42 may not include a recess 87.

In an exemplary embodiment, guard member 72 may be positioned such that space 88 is only large enough to prevent guard member 72 from interfering with rotation of roller body 42. However, it should be understood that other spacings are possible. In some embodiments, space 88 may be defined by a labyrinth interface (not shown) that includes a pathway with a plurality of turns between upper rim 82 and roller body 42.

Further, space 88 may be configured to extend substantially perpendicular to passageway 70 and lead to an area between main body 74 and collar member 68. In this way, foreign material (e.g., dirt, sand, etc.) that manages to travel through space 88 may be directed to the area between main body 74 and collar member 68 instead of passageway 70. The foreign material may then be directed by gravity out of one of openings 84.

Figure 4:
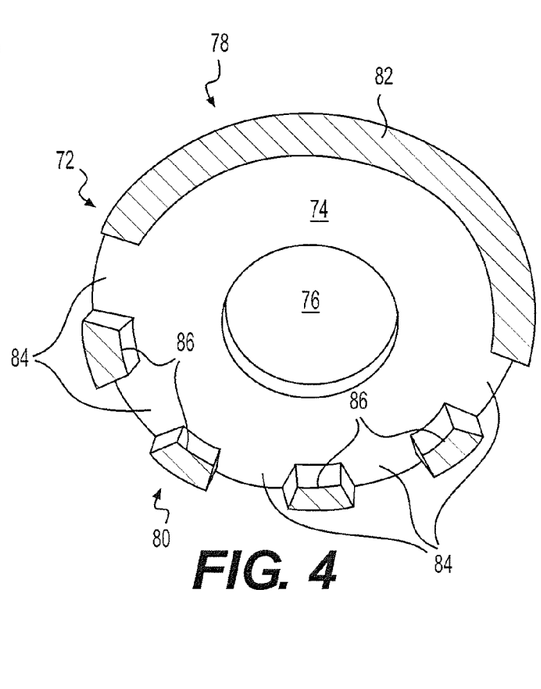
FIG. 4 is a front-view illustration of an exemplary disclosed guard member that may be used in conjunction with the track roller of FIGS. 2-3.

FIG. 4 depicts a front view of an interior of guard member 72, including an inside surface of main body 74, upper rim 82, and projections 86. In an exemplary embodiment, upper rim 82 and projections 86 may be shaped as annular sectors positioned around a perimeter of main body 74, although other shapes and configurations are possible. As shown, upper rim 82 may extend around a perimeter of upper portion 78 and each projection 86 may be positioned symmetrically around a perimeter of lower portion 80 such that opposing ends of upper rim 82 and projections 86 define openings 84.

In the exemplary embodiment of FIG. 4, upper rim 82 and four projections 86 may define five equally-spaced openings 84. However, it should be understood that guard member 72 may include other arrangements of upper rim 82, projections 86, and openings 84. For example, guard member 72 may include more or less and/or larger or smaller openings 84 than that depicted in FIG. 4. In another example, guard member 72 may include openings 84 of varying size.

Figures 5, 6:
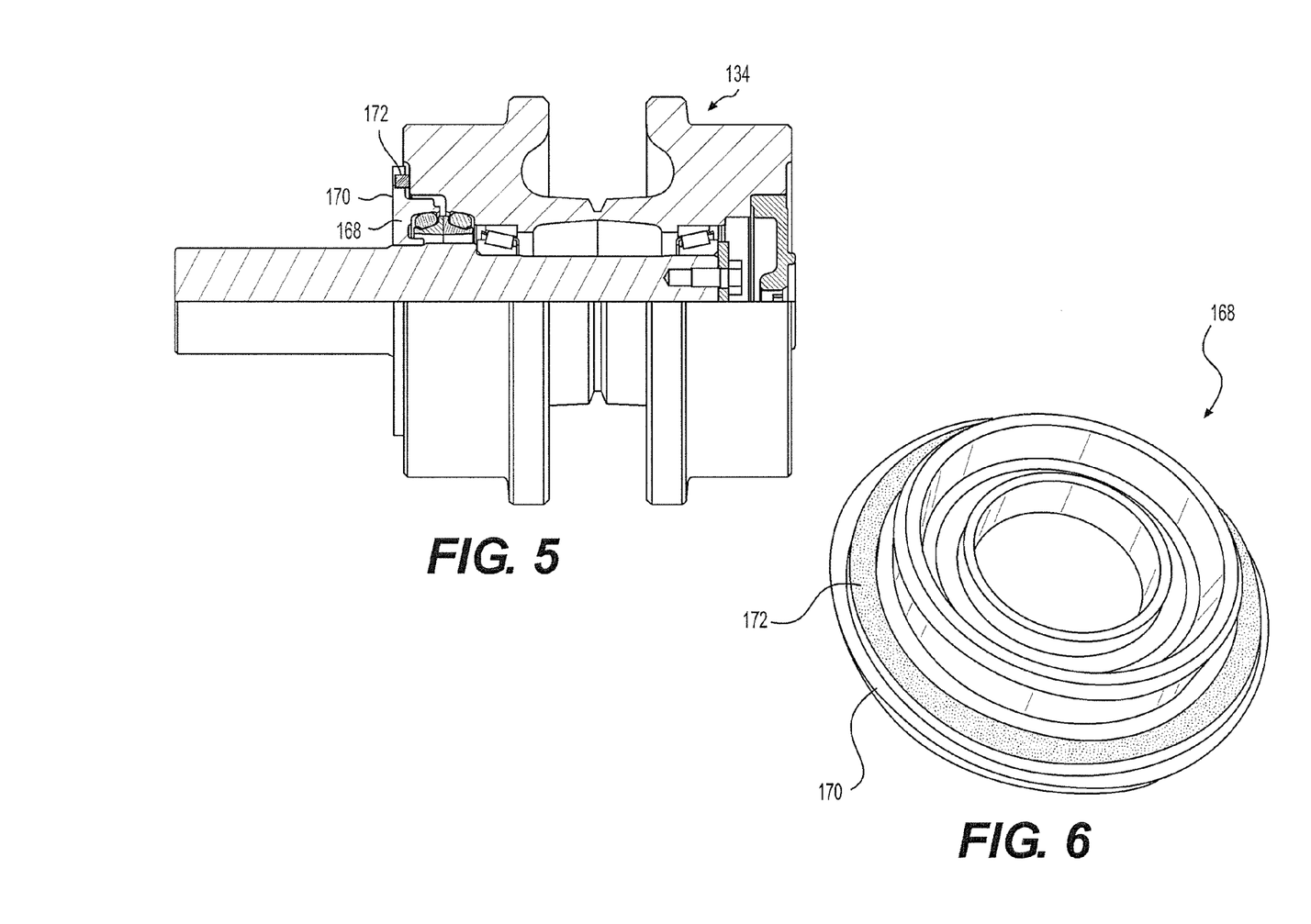
FIG. 5 is a cut-away view of another exemplary disclosed track roller that may be used in conjunction with the track-type machine of FIG. 1.
FIG. 6 is a perspective-view illustration of an exemplary disclosed collar member that may be used in conjunction with the track roller of FIG. 5.

As depicted in FIGS. 5-6, a second embodiment of a device for protecting sealing member 64 includes a modified collar member 168. As shown in FIG. 5, collar member 168 may be implemented on a carrier roller 134. Carrier roller 134 may be the same as or similar to carrier roller 34 depicted in FIGS. 2-3, except for the replacement of collar member 68 and guard member 72 with modified collar member 168. Collar member 168 may include the same or similar features as collar member 68, including a cover portion positioned over a fixed portion of sealing member 64 and forming passageway 70 with an interior surface of roller body 42. However, as shown in FIGS. 5-6, collar member 168 may also include an extended flange 170 and a protective seal 172.

Extended flange 170 may extend radially beyond the cover portion of collar member 168 to a position adjacent a side portion of roller body 42. Thus, extended flange 170 may cover an opening into passageway 70. Protective seal 172 may be attached to an inside surface of extended flange 170 and project towards and contact the side portion of roller body 42. Protective seal 172 may be fabricated from a material configured to remain in contact with roller body 42 as roller body 42 rotates and collar member 168 remains fixed. For example, protective seal 172 may be fabricated form a material such as Kevlar. Protective seal 172 may remain in contact with roller body 42 to prevent foreign material from entering passageway 70 and reaching sealing member 64.

Figure 7:
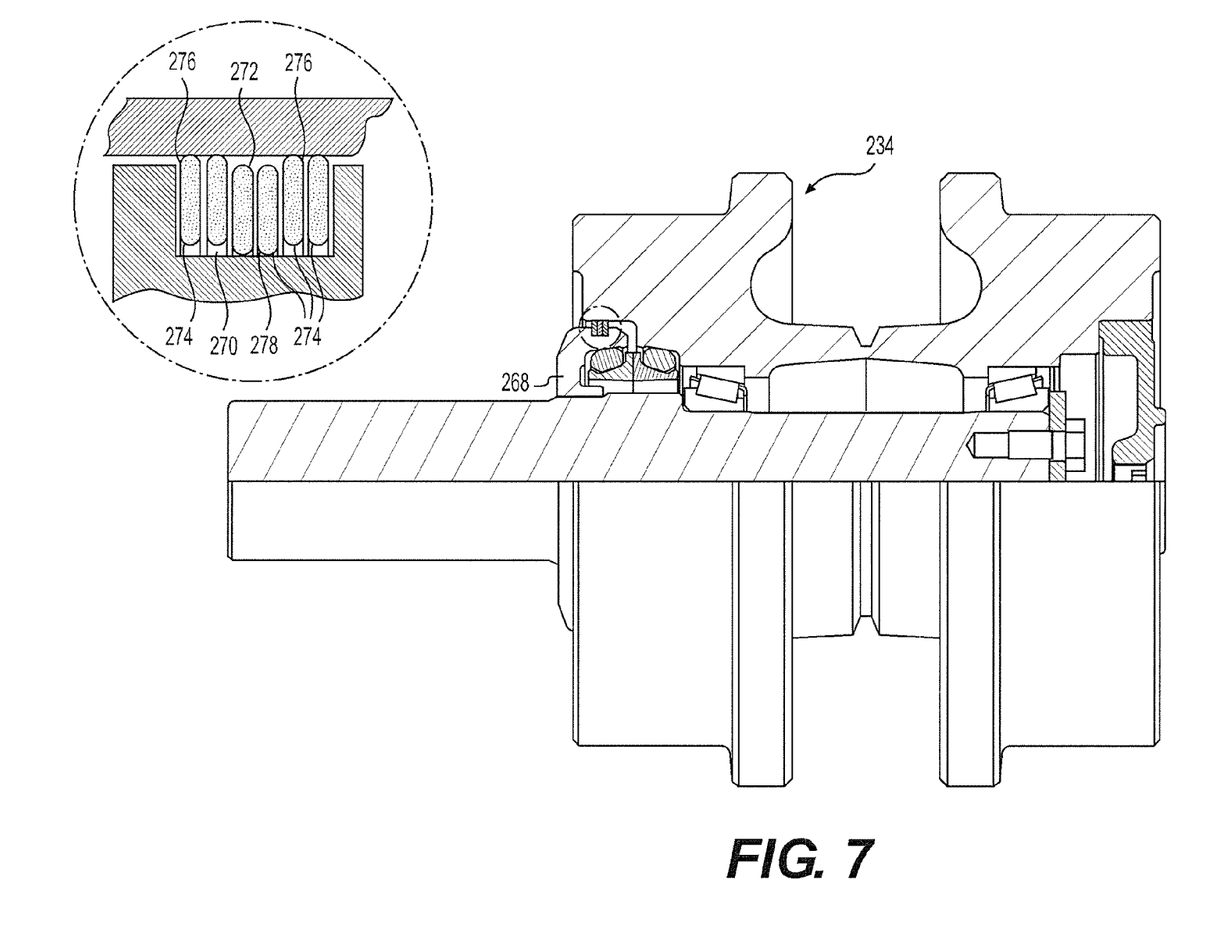
FIG. 7. is a cut-away view of yet another exemplary disclosed track roller that may be used in conjunction with the track-type machine of FIG. 1.

As depicted in FIG. 7, a third embodiment of a device for protecting sealing member 64 includes another modified collar member 268. Collar member 268 may be implemented on a carrier roller 234, which may be the same as or similar to carrier rollers 34, except for the replacement of collar member 68 and guard member 72 with modified collar member 268. Collar member 268 may include the same or similar features as collar member 68, including a cover portion positioned over a fixed portion of sealing member 64 and forming passageway 70 with an interior surface of roller body 42. However, as shown in FIG. 7, collar member 268 may also include a groove 270 and a laminar seal 272 positioned at least partially in groove 270.

Groove 270 may be defined in an outer surface of the cover portion of collar member 268, adjacent passageway 70. Laminar seal 272 may be positioned in groove 270 and extend to an inside surface of roller body 42 on an opposite side of passageway 70, creating a blockage that may inhibit foreign materials that enter passageway 70 from reaching sealing member 64. In an exemplary embodiment, laminar seal 272 may include a plurality of rings 274. In one embodiment, laminar seal 272 may include three sets of double-wound rings 274. Rings 274 may be fabricated from a strong and durable material, such as steel, although other materials may be possible.

As shown in FIG. 7, rings 274 may be alternately positioned to create a labyrinth-type seal that inhibits debris from traveling through passageway 70. For example, rings 274 may include a pair of outer rings 276 in contact with the inside surface of roller body 42 and an inner ring 278 in contact with a surface of collar member 268 inside groove 270. Outer rings 276 may be configured to rotate with roller body 42 while inner ring 278 remains stationary in groove 270. In this way, outer rings 276 may seal outwardly while inner ring 278 seals inwardly, thus combining to help block foreign material from reaching sealing member 64.

The exemplary disclosed embodiments of FIGS. 2-7 have been depicted and described with respect to a carrier roller 34, 134, or 234. It should be understood, however, that the disclosed concepts may be applied to other track rollers of track roller assembly 12. For example, any of the protective devices described herein, such as guard member 72, modified collar member 168, protective seal 172, modified collar member 268, and/or laminar seal 272, may be implemented on a lower roller 28 and/or idler assembly 38. It should be understood that the protective devices and/or track rollers may be modified to accommodate the different features of lower rollers 28 and/or idler assembly 38. For example, guard member 72 may be attached to an axle or integrated into an attachment hub on one or more ends of the axle of a lower roller 28. Similarly, guard member 72 may be integrated into or otherwise attached to an end cap of an idler assembly 38. In other embodiments, two guard members 72 may be attached to a track roller, one on each side, such as on track rollers that include a sealing member 64 on each side of a roller body 42.

INDUSTRIAL APPLICABILITY

The disclosed protection devices may be applicable to any equipment that includes rotating parts that may be exposed to debris. The disclosed protection devices may be particularly applicable to protecting sealing members of track rollers and idlers of a mobile machine track roller assembly. In particular, the disclosed embodiments and features may inhibit debris from reaching a sealing member and thus may increase the lifetime of a corresponding track roller by helping to prevent failure of the sealing member. Operation of a machine including a disclosed guard member will now be described.

In one example, machine 10 may be used in a landfill application to lift and move landfill materials. Machine 10 may be outfitted with track roller assembly 12, which may allow endless track 24 to rotate and move machine 10 throughout the area. Track roller assembly 12 may include carrier rollers 34 that each include a guard member 72 installed on shaft 46. As machine 10 operates in the landfill, debris such as wire, rope, trash materials, dirt, sand, etc., may come into contact with various components of track roller assembly 12.

Debris that finds its way near one of carrier rollers 34 may be urged towards an opening into passageway 70. However, closed upper portion 78 of guard member 72, which may extend radially beyond the opening into passageway 70 and axially into recess 87, may block large debris (e.g., wire, rope, scrap materials, etc.) from even approaching the opening. In addition, smaller debris (e.g., dirt, sand, etc.) that makes its way through space 88 may be directed to an area between main body 74 and collar member 68 instead of passageway 70. Further, partially-open lower portion 80 may allow the smaller debris that does reach an interior side of guard member 72 to fall out to the exterior of carrier roller 34.

As described herein, guard member 72 and the other exemplary disclosed protection devices may allow machine 10 to operate in environments that include various debris that may otherwise damage a track roller by inhibiting the debris from reaching the sealing members 64 of track roller assembly 12. Thus, the disclosed protection devices may help prevent failure of the track rollers of track roller assembly 12 and therefore promote efficient and uninterrupted operation of machine 10. Further, guard member 72, in particular, may include features that prevent debris from packing and building up inside guard member 72, helping to ensure proper operation of guard member 72 and further protecting the track roller from failure.

It will be apparent to those skilled in the art that various modifications and variations can be made to the disclosed mobile machine track roller. Other embodiments will be apparent to those skilled in the art from consideration of the specification and practice of the disclosed guard member. It is intended that the specification and examples be considered as exemplary only, with a true scope being indicated by the following claims and their equivalents.

What is claimed is:
1. A track roller for a mobile machine, comprising:
a shaft defining a central axis;
a roller body connected to the shaft and configured to rotate around the central axis relative to the shaft;
a sealing member positioned between the shaft and the roller body;
a collar member secured to the shaft and at least partially covering the sealing member;
a passageway defined between the collar member and the roller body, the passageway including an opening;
a guard member secured to the shaft, the guard member including:
a main body;
an upper rim extending from the main body towards the roller body;
a plurality of projections extending from the main body towards the roller body, and
a plurality of openings formed between the upper rim and the projections,
wherein the upper rim extends around approximately half of a circumference of the main body and extends out to a position adjacent the roller body that is radially farther away from the central axis than the opening.

2. The track roller of claim 1, wherein the roller body overlies at least a portion of an upper surface of the upper rim.

3. The track roller of claim 2, wherein the roller body includes a recess and the upper rim extends into the recess.

4. The track roller of claim 1, wherein a space is defined between the upper rim and the roller body.

5. The track roller of claim 4, wherein the space extends substantially perpendicular to the passageway.

6. The track roller of claim 4, wherein the space leads to an area between the guard member and the collar member.

7. The track roller of claim 4, wherein the space is defined by a labyrinth interface that includes a pathway having a plurality of turns between the upper rim and the roller body.

8. The track roller of claim 1, wherein the passageway leads to the sealing member.

9. The track roller of claim 8, wherein the sealing member is a mechanical face seal.

10. The track roller of claim 1, wherein the upper rim is shaped as an annular sector projecting from the main body.

11. The track roller of claim 10, wherein the plurality of openings communicate an interior space, located between the guard member and the collar member, with an exterior of the guard member.

12. The track roller of claim 1, wherein the guard member is fixed relative to the shaft.

13. The track roller of claim 12, wherein the main body of the guard member includes a bore that is press-fit onto the shaft.

14. A track roller for a mobile machine, comprising:
a shaft defining a central axis;
a roller body connected to the shaft and configured to rotate around the central axis relative to the shaft;
a sealing member positioned between the shaft and the roller body;
a collar member secured to the shaft and at least partially covering the sealing member;
a passageway defined between the collar member and the roller body, the passageway including an opening;
a guard member secured to the shaft, the guard member including:
a main body;
an upper portion; and
a lower portion including a plurality of openings,
wherein the plurality of openings are located around approximately half of a circumference of the guard member, and communicate an interior space, located between the guard member and the collar member, with an exterior of the guard member.

15. The track roller of claim 14, wherein the upper portion includes an upper rim and the lower portion includes a plurality of projections, and wherein opposing ends of the upper rim and the plurality of projections define the plurality of openings.

16. The track roller of claim 15, wherein the upper rim and the plurality of projections are shaped as annular sectors projecting from the main body.

17. The track roller of claim 15, wherein the roller body overlies at least a portion of an upper surface of the upper rim.

18. The track roller of claim 15, wherein a space is defined between the upper rim and the roller body, and wherein the space leads to the area between the main body and the collar member.

19. The track roller of claim 14, wherein the plurality of openings are equally spaced around a perimeter of the guard member.

20. A track roller for a mobile machine, comprising:
a shaft defining a central axis;
a roller body connected to the shaft and configured to rotate around the central axis relative to the shaft;
a sealing member positioned between the shaft and the roller body;
a collar member secured to the shaft and at least partially covering the sealing member;
a passageway defined between the collar member and the roller body, the passageway including an opening;
a guard member secured to the shaft, the guard member including:
a main body;
a closed upper portion including an upper rim extending from the main body towards the roller body; and
a partially-open lower portion including a plurality of openings,
wherein the upper rim extends out to a position adjacent the roller body that is radially farther away from the central axis than the opening into the passageway, and
wherein the plurality of openings communicate an interior space, located between the main body and the collar member, with an exterior of the guard member.

* * * * *